United States Patent
Klutchko et al.

[11] 3,862,141
[45] Jan. 21, 1975

[54] 1-SUBSTITUTED 1,2,3,4-TETRAHYDROXANTHEN-9-ONES

[75] Inventors: Sylvester Klutchko, Hackettstown; Maximilian Von Strandtmann, Rockaway; John Shavel, Jr., Mendham, all of N.J.

[73] Assignee: Warner-Lambert Company, Morris Plains, N.J.

[22] Filed: Aug. 23, 1973

[21] Appl. No.: 390,961

[52] U.S. Cl. ................................ 260/335, 424/283
[51] Int. Cl. ............................................ C07d 7/44
[58] Field of Search ................................. 260/335

[56] References Cited
FOREIGN PATENTS OR APPLICATIONS
8,546    5/1965    Japan

*Primary Examiner*—Norma S. Milestone
*Attorney, Agent, or Firm*—Albert H. Graddis; Frank S. Chow

[57] ABSTRACT

This invention is concerned with 1-substituted 1,2,3,4-tetrahydroxanthen-9-ones of type I,

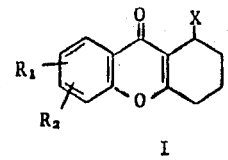

wherein X is hydroxy or carbonyl oxygen, $R_1$ and $R_2$ are hydrogen, halogen, lower alkyl, lower alkoxy or hydroxy, or $R_1$ and $R_2$ taken together forming another ring such as benzene. These compounds are useful in allergic conditions such as bronchial asthma.

9 Claims, No Drawings

1-SUBSTITUTED 1,2,3,4-TETRAHYDROXANTHEN-9-ONES

This invention is concerned with 1-substituted 1,2,3,-4-tetrahydroxanthen-9-ones of type I,

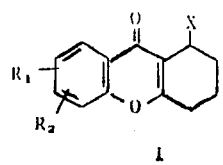

I wherein X is hydroxy or carbonyl oxygen, $R_1$ and $R_2$ are hydrogen, halogen, lower alkyl, lower alkoxy or hydroxy, or $R_1$ and $R_2$ taken together forming another ring such as benzene.

These compounds are useful in allergic conditions such as bronchial asthma. Thus, the compounds of this invention are active orally or i.p. in the prevention of allergic and asthmatic reactions in rats at dose levels of 100-150 mg/kg. For example, compound I wherein $R_1$ is hydrogen, $R_2$ is 5-isopropyl and X is hydroxy shows a 54% inhibition of the allergic response at 100 mg/Kg when tested in the passive cutaneous anaphalaxis (PCA) screen, which is a modification of procedures described by I. Mota, *Life Sciences*, 7, 465 (1963) and Z. Ovary, O. Bier, *Proc. Soc. Exptl. Biol. Med.*, 81, 585 (1952).

Consequently these compounds are indicated in the management of allergic conditions such as bronchial asthma, and hay fever.

Generally speaking, an oral dose of 100-150 mg/kg two or three times daily is suggested. This regimen may be varied depending on the severity of the condition, the age, weight, sex of the host being treated.

In addition to the above pharmacological activity, the compounds of this invention also exhibit gastric antiulcer activity at a dose of 10-100 mg/Kg in experimental animals such as rats. For example, when a compound of type I wherein $R_1$ and $R_2$ are hydrogen and X is hydroxyl is tested according to the procedure according to H. Shay, et. al., *Gastroenterology*, 5, 43 (1945), in the pylorus ligated rat, at a dose of 20 mg/Kg i.p., it caused a reduction of 52.2% in volume of gastric acid and a 31.5% reduction in the hydrogen ion concentration compared controls.

The compounds are administered in dosage forms suitable for human and veterinary usages. They include for example tablets, capsules, and injections which are formulated by methods known to the pharmacist's art.

According to one aspect of this invention, when X is hydroxy these compounds are prepared from o-hydroxy-ω-(methylsulfinyl) acetophenones II, which are prepared in accordance with the disclosure in U.S. Pat. No. 3,801,644 issued Apr. 2, 1974.

The conversion is carried out according to the following scheme:

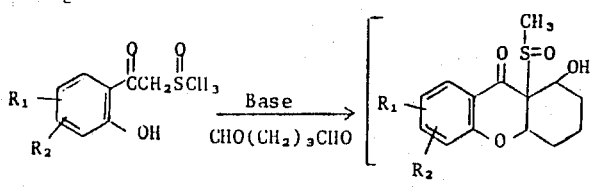

Referring to the above scheme, compound II is cyclized with glutaric dialdehyde in the presence of a base catalyst such as piperidine at mild temperatures such as 50°-80° C. The intermediate III which may or may not be isolated is then converted to I, wherein X is hydroxy, by thermal elimination of the elements of $CH_3SOH$ at 110° to 140° C.

The compounds of this invention I where X is carbonyl oxygen are prepared by oxidation of compounds I wherein X is hydroxy, preferably using the Jones reagent in acetone according to the following scheme:

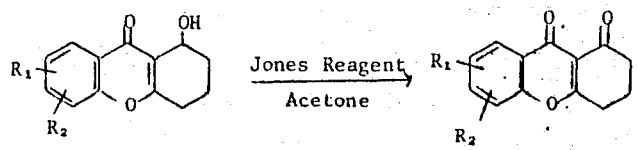

To further illustrate the practice of this invention the following examples are included. Temperatures referred to hereinafter are in degrees Centigrade.

EXAMPLE 1

1,2,3,4-Tetrahydro-1-hydroxy-5-methoxyxanthen-9-one.

A mixture of 22.8 g (0.1 mol) of 2'-hydroxy-3'-methoxy-2-(methylsulfinyl)-acetophenone, 40 g (0.1 mol) of 25% aqueous glutaric dialdehyde, 100 ml of dimethylformamide and 2 ml of piperidine was heated with stirring. At 50° C all solid went into solution. At 105°-115° the volatiles were distilled off. After ½ hour the temperature was 150° and the volume was about one half of the original volume. Most of the remaining dimethylformamide was removed at reduced pressure. The remaining viscous material, which became partly crystalline on standing several days, was triturated with 50 ml of ethyl acetate, filtered and the filter cake was washed efficiently with 25 ml of ethyl acetate; wt. 13.5 g (55%); mp 136°-138°. Recrystallization from the ethyl acetate gave pure product; mp 138°-140°.

Anal. Calcd for $C_{14}H_{14}O_4$: C, 68.28; H, 5.73. Found: C, 68.11; H, 5.81.

EXAMPLE 2

1,2,3,4-Tetrahydro-1-hydroxyxanthen-9-one

A stirred mixture of 49.5 g (0.25 mol) of 2'-hydroxy-2-(methylsulfinyl)-acetophenone, 200 ml of dimethylformamide, 100 g (0.25 mol) of 25% glutaric dialdehyde and 2 ml of piperidine was reacted under the same conditions as those described for the preparation of 1,-2,3,4-tetrahydro-1-hydroxy-5-methoxyxanthen-9-one to give 20 g (33%) of product; mp 104°-105°. Recrystallization from ethyl acetate gave pure pale yellow crystals; mp 107°-109°.

Anal. Calcd for $C_{13}H_{12}O_3$: C, 72.21; H, 5.59. Found: C, 72.38; H, 5.65.

EXAMPLE 3

1,2,3,4-Tetrahydro-1-hydroxy-5-isopropylxanthen-9-one

A mixture of 60 g (0.25 mol) of 2'-hydroxy-3'-isopropyl-2-(methylsulfinyl-acetophenone, 100 g (0.25 mol) of 25% glutaric dialdehyde, 300 ml of dimethyl-

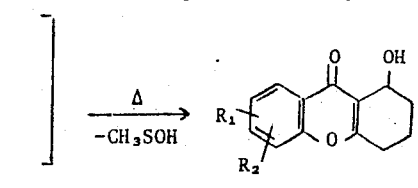

formamide and 2 ml of piperidine was reacted under the same conditions described for the preparation of 1,2,3,4-tetrahydro-1-hydroxy-5-methoxyxanthen-9-one to give 24 g (37%) of product melting at 111°–113°. Recrystallization from ethyl acetate gave pure, cream colored material; mp 114°–116°.

Anal. Calcd for $C_{16}H_{18}O_3$: C, 74.39; H, 7.02. Found: C, 74.35; H, 7.14.

EXAMPLE 4

7-Chloro-1,2,3,4-tetrahydro-1-hydroxyxanthen-9-one

A mixture of 58.15 g (0.25 mol) of 5'-chloro-2'-hydroxy-2-(methylsulfinyl)-acetophenone, 100 g (0.25 mol) of 25% glutaric dialdehyde, 300 ml of dimethylformamide and 2 ml of piperidine was reacted under the same conditions described for the preparation of 1,2,3,4-tetrahydro-1-hydroxy-5-methoxyxanthen-9-one to give 14.0 g (23%) of product melting at 144°–146°. Recrystallization from ethyl acetate gave pure, tan colored crystals; mp 145°–147°.

Anal. Calcd for $C_{13}H_{11}ClO_3$: C, 62.29; H, 4.42. Found: C, 62.24; H, 4.42.

EXAMPLE 5

8,9,10,11-Tetrahydro-8-hydroxy-7H-benzo[c]xanthen-7-one

Preparation of intermediate 7a,8,9,10,11,11a-hexahydro-8-hydroxy-7a-(methylsulfinyl)-7H-benzo[c]xanthen-7-one.

A stirred mixture of 24.8 g (0.1 mol) of 1'-hydroxy-2-(methylsulfinyl)-2'-acetonaphthone, 400 ml of methanol, 40.0 g (0.1 mol) of 25% glutaric dialdehyde and 1 ml of piperidine was heated at reflux for 1 hour. Water (500 ml) was added to the solution to precipitate a viscous material which partly crystallized. The supernatant was decanted, the residue was triturated with 100 ml of water and the mixture was filtered. The dried filter cake was heated with 30 ml of abs. ethanol to 70° and the mixture was stirred for 5 min., cooled, filtered and the filter cake washed with cold ethanol; wt. 10.0 g; mp 155°–158°. Recrystallization from ethanol gave broad melting crystals; mp 160°–163°, which apparently consists of isomers.

Anal. Calcd for $C_{18}H_{18}O_4S$: C, 65.43; H, 5.49; S, 9.78. Found: C, 65.39; H, 5,64; S, 9.66.

Elimination Reaction on Intermediate Methylsulfinyl Derivative

A mixture of 10.0 g (0.03 mol) of 7a,8,9,10,11,11a-hexahydro-8-hydroxy-7a-(methylsulfinyl)-7H-benzo[c]xanthen-7-one and 100 ml of xylene was heated at reflux for 5 minutes. The resulting solution yielded crystals on cooling; wt. 6.9 g (85%); mp 175°–178°. Recrystallization from 2-propanol gave pure 8,9,10,11-tetrahydro-8-hydroxy-7H-benzo[c]xanthen-7-one; mp 177°–180°.

Anal. Calcd for $C_{17}H_{14}O_3$: C, 76.67; H, 5.30. Found: C, 76.79; H, 5.36.

EXAMPLE 6

1,2,3,4-Tetrahydro-5-methoxyxanthen-1,9-dione

A solution of 3.85 g (0.035 mol) of chromium trioxide (10% excess), 25 ml of water and 3.1 ml of conc. sulfuric acid was added over a 5 minute period to a stirred solution of 12.3 g (0.05 mol) of 1,2,3,4-tetrahydro-1-hydroxy-5-methoxyxanthen-9-one in 1,800 ml of acetone. A greenish, finely divided solid separated. The mixture was stirred overnight and filtered. Both the filter cake and the filtrate contained product and were worked up. The filter cake, apparently containing a chromium complex of the diketone, was dissolved in 75 ml of water and heated at 80° on the steam bath for 10 minutes to destroy the complex. The separated crude solid was filtered, washed well with water and dried; wt. 4.0 g; mp 200°–230°. The acetone filtrate was concentrated and the residue was treated with 300 ml water to give another 2.1 g of crude product; mp 190°–220°. Total wt. of crude was 6.1 g (50%). Purification was effected by dissolution in hot chloroform, filtration to remove insolubles and addition of ethyl acetate. The pure crystal, thus obtained, melted at 236°–238°.

Anal. Calcd for $C_{14}H_{12}O_4$: C, 68.85; H, 4.95. Found: C, 68.61; H, 5.07.

EXAMPLE 7

1,2,3,4,-Tetrahydroxanthen-1,9-dione

This compound was prepared using the same reaction and work up conditions as in the preparation of 1,-2,3,4-tetrahydro-5-methoxyxanthen-1,9-dione. The quantities used were 11.88 g (0.055 mol) of 1,2,3,4-tetrahydro-1-hydroxy-xanthen-9-one in 1800 ml of acetone with a solution of 4.24 g (0.039 mol) of $CrO_3$ (10% excess), 28 ml of water and 3.4 ml of conc. $H_2SO_4$. The purified product weighed 2.7 g (23%) and melted at 211°–213°. Recrystallization from chloroform-ethyl acetate gave pure product; mp 212°–213°.

Anal. Calcd for $C_{13}H_{10}O_3$: C, 72.89; H, 4.71. Found: C, 72.87; H, 4.65.

EXAMPLE 8

7-Chloro-1,2,3,4-tetrahydroxanthen-1,9-dione

This compound was prepared using the same reaction and work up conditions as in the preparation of 1,-2,3,4-tetrahydro-5-methoxyxanthen-1,9-dione. The quantities used were 12.5 g (0.05 mol) of 7-chloro-1,2,3,4-tetrahydro-1-hydroxyxanthen-9-one in 700 ml of acetone with a solution of 3.5 g (0.035 mol) of $CrO_3$, 25 ml of water and 3.1 ml conc. $H_2SO_4$ as the oxidizing agent. The purified product weighed 3.4 g (23%) and melted at 239°–242°.

Anal. Calcd for $C_{13}H_9ClO_3$: C, 62.79; H, 3.65; Cl, 14.26. Found: C, 62.52; H, 3.49; Cl, 14.92.

We claim:

1. A compound of the formula

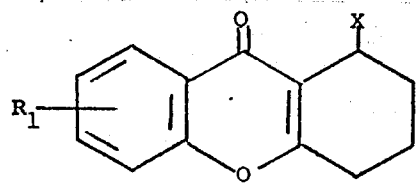

and

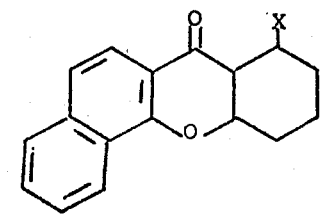

wherein X is hydroxy or carbonyl oxygen, and $R_1$ is hydrogen, halogen, lower alkyl or lower alkoxy.

2. A compound according to claim 1 which is 1,2,3,4-Tetrahydro-1-hydroxy-5-methoxyxanthen-9-one.

3. A compound according to claim 1 which is 1,2,3,4-Tetrahydro-1-hydroxyxanthen-9-one.

4. A compound according to claim 1 which is 1,2,3,4-Tetrahydro-1-hydroxy-5-isopropylxanthen-9-one.

5. A compound according to claim 1 which is 7-Chloro-1,2,3,4-tetrahydro-1-hydroxyxanthen-9-one.

6. A compound according to claim 1 which is 8,9,10,11-Tetrahydro-8-hydroxy-7H-benzo[c]xanthen-7-one.

7. A compound according to claim 1 which is 1,2,3,4-Tetrahydro-5-methoxyxanthen-1,9-dione.

8. A compound according to claim 1 which is 1,2,3,4-Tetrahydroxanthen-1,9-dione.

9. A compound according to claim 1 which is 7-Chloro-1,2,3,4-tetrahydroxanthen-1,9-dione.

* * * * *